(12) United States Patent
Ishibashi

(10) Patent No.: US 10,001,174 B2
(45) Date of Patent: Jun. 19, 2018

(54) BEARING DEVICE AND BEADING DEVICE FIXING PLATE

(71) Applicant: NSK LTD., Tokyo (JP)

(72) Inventor: Yutaka Ishibashi, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days. days.

(21) Appl. No.: 15/313,658

(22) PCT Filed: May 26, 2015

(86) PCT No.: PCT/JP2015/065129
§ 371 (c)(1),
(2) Date: Nov. 23, 2016

(87) PCT Pub. No.: WO2015/182617
PCT Pub. Date: Dec. 3, 2015

(65) Prior Publication Data
US 2017/0204911 A1 Jul. 20, 2017

(30) Foreign Application Priority Data
May 27, 2014 (JP) ................................. 2014-108948
Sep. 4, 2014 (JP) ................................. 2014-180287
Feb. 13, 2015 (JP) ................................. 2015-026621

(51) Int. Cl.
*F16C 35/077* (2006.01)
*F16C 19/06* (2006.01)

(52) U.S. Cl.
CPC ............ *F16C 35/077* (2013.01); *F16C 19/06* (2013.01); *F16C 2361/61* (2013.01)

(58) Field of Classification Search
CPC ...................................................... F16C 35/077
See application file for complete search history.

(56) References Cited

U.S. PATENT DOCUMENTS

| | | | | |
|---|---|---|---|---|
| 3,469,897 A | * | 9/1969 | Rike | F16C 35/067 384/542 |
| 6,409,390 B1 | * | 6/2002 | Bouzakis | F16C 19/54 384/517 |
| 7,246,948 B2 | * | 7/2007 | Fisk | B21D 19/088 384/537 |
| 8,424,209 B2 | * | 4/2013 | Katougi | F16C 33/586 29/505 |

FOREIGN PATENT DOCUMENTS

| | | |
|---|---|---|
| CN | 2592946 Y | 12/2003 |
| CN | 1734001 A | 2/2006 |
| DE | 1 575 609 A1 | 1/1970 |

(Continued)

OTHER PUBLICATIONS

Machine translation of JP2014029197.*
(Continued)

*Primary Examiner* — Thomas R Hannon
(74) *Attorney, Agent, or Firm* — Sughrue Mion, PLLC

(57) ABSTRACT

A fixing plate (40) is provided with through holes (45) for reducing the rigidity of the fixing plate (40) between a latch hole (41) and boss parts (42), the through holes being disposed between the latch hole (41) and the boss parts (42) and radially outward from the outer circumferential surface of an outer ring (31).

3 Claims, 19 Drawing Sheets

(56) References Cited

FOREIGN PATENT DOCUMENTS

| | | |
|---|---|---|
| EP | 2199634 A2 | 6/2010 |
| JP | 57-1914 U | 1/1982 |
| JP | 2006-180570 A | 7/2006 |
| JP | 2010-249214 A | 11/2010 |
| JP | 2012-132495 A | 7/2012 |
| JP | 2012-189195 A | 10/2012 |
| JP | 2014-29197 A | 2/2014 |
| WO | 03/081750 A1 | 10/2003 |
| WO | 2010/069715 A2 | 6/2010 |

OTHER PUBLICATIONS

Machine translation of JP2012189195.*
Machine translation of JP2012132495.*
Extended European Search Report dated Feb. 10, 2017 issued by European Patent Office in counterpart European Application No. 15800214.7.
Search Report dated Aug. 25, 2015, issued by the International Searching Authority in counterpart International Patent Application No. PCT/JP2015/065129 (PCT/ISA/210).
Written Opinion dated Aug. 25, 2015, issued by the International Searching Authority in counterpart International Patent Application No. PCT/JP2015/065129 (PCT/ISA/237).
Communication dated Feb. 24, 2018 from the State Intellectual Property Office of People's Republic of China in counterpart Application No. 201580028258.5.

* cited by examiner

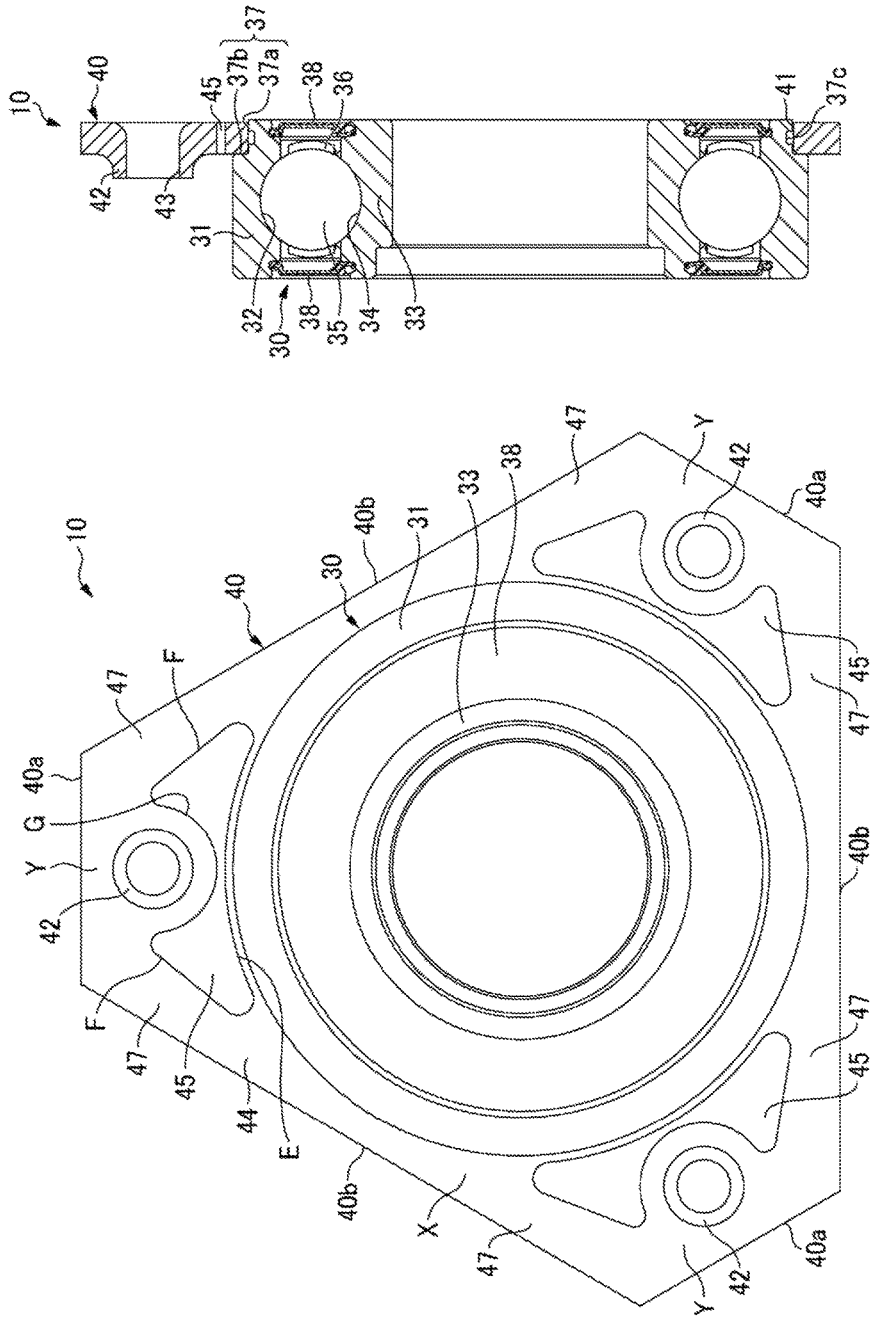

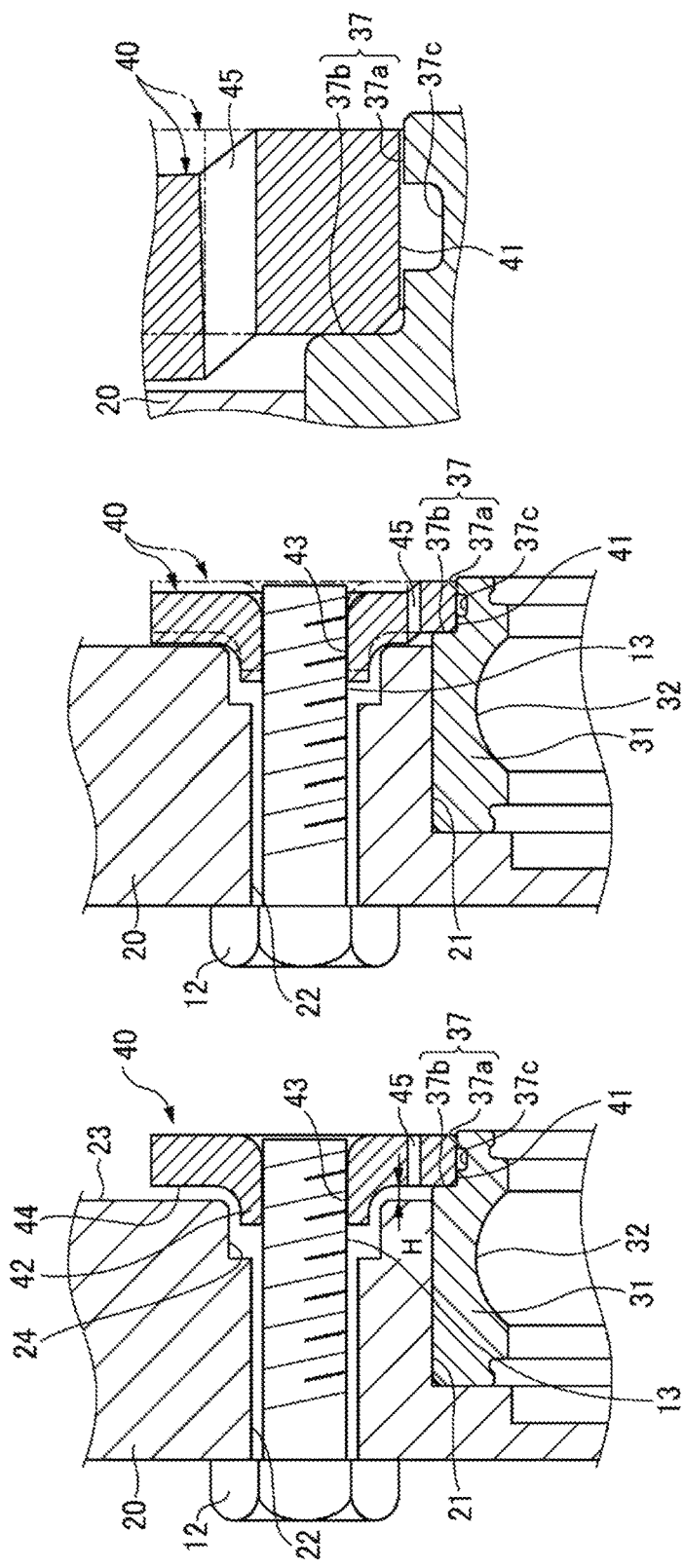

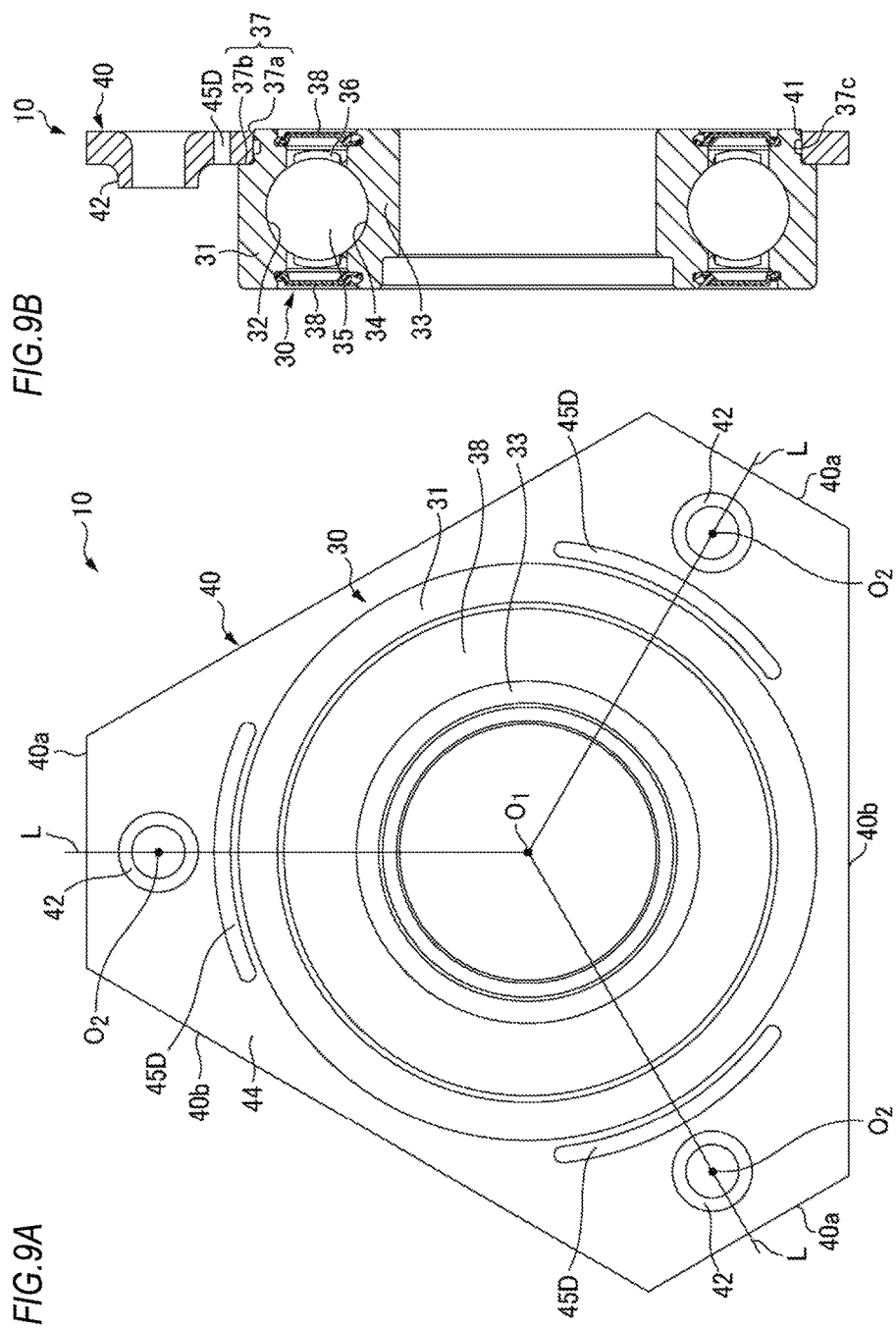

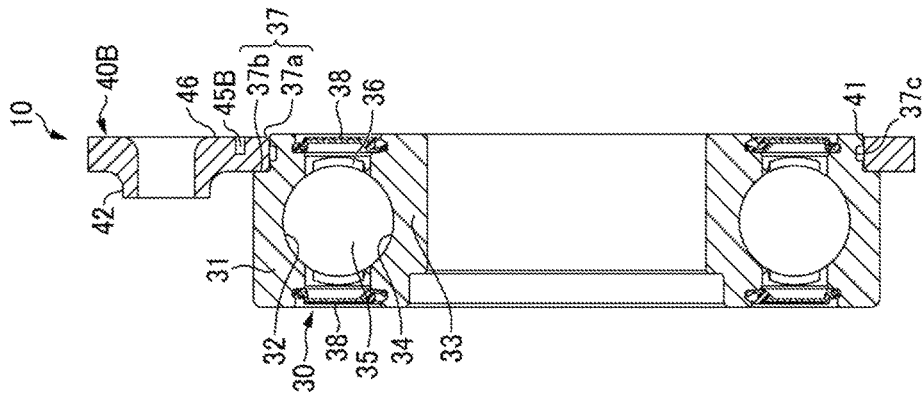
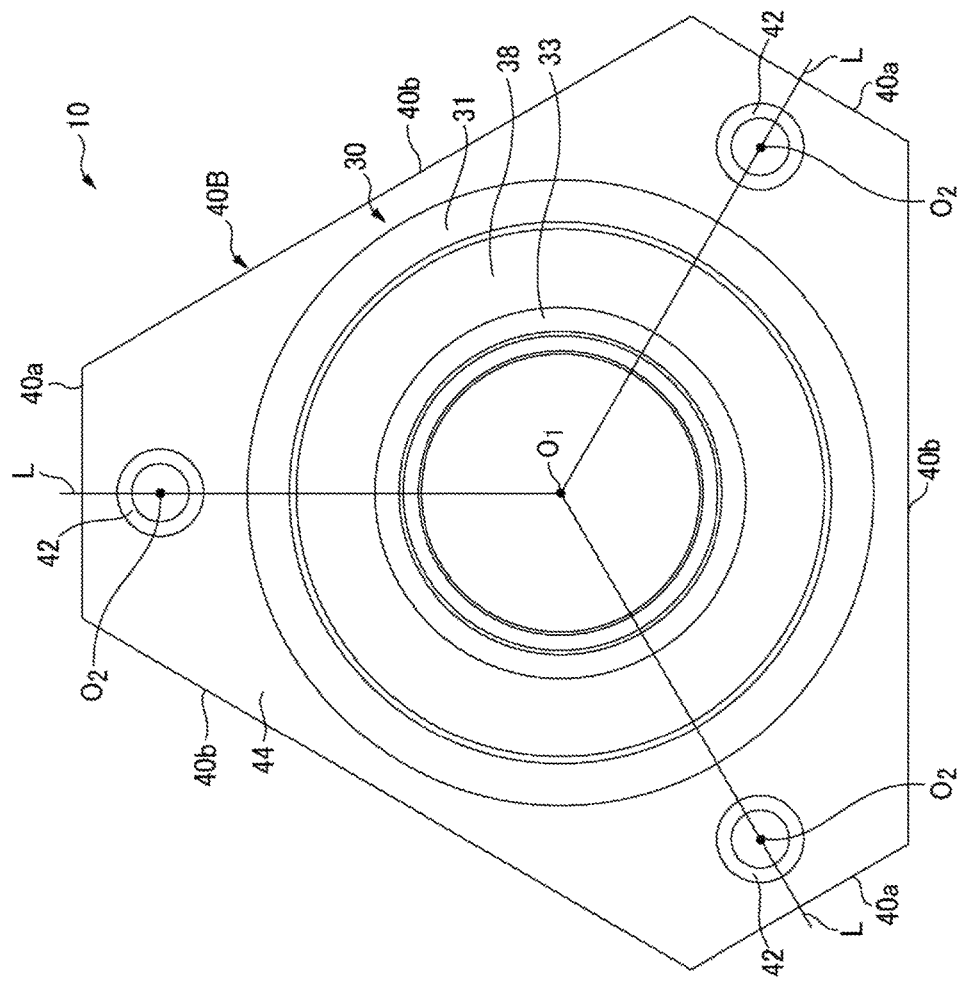

BEARING DEVICE AND BEADING DEVICE FIXING PLATE

TECHNICAL FIELD

The present invention relates to a bearing device and a retainer plate for a bearing device, and more particularly, to a bearing device and a retainer plate for a bearing device to be used for a rotation support part of a gear or the like of a transmission or a differential gear device.

RELATED ART

In the related art, a bearing configured to support a rotary shaft for which a pulley, a gear and the like of a transmission for an automobile are provided is firmly fixed to a housing with being sandwiched by the housing and a retainer plate fixed to the housing by bolts (for example, refer to Patent Documents 1 and 2).

FIG. 20 depicts an example of a bearing device 100 of the related art. An end portion of a rotary shaft 101 is rotatably supported to a housing 103 via a radial rolling bearing 102. The radial rolling bearing 102 has an outer ring 105 having an outer ring raceway 104 on an inner peripheral surface, an inner ring 107 having an inner ring raceway 106 on an outer peripheral surface, and a plurality of balls 108 provided so as to be freely rollable between the outer ring raceway 104 and the inner ring raceway 106. The outer ring 105 of the radial rolling bearing 102 is internally fitted to a retaining concave part 109 formed at the housing 103. A fitting hole 113 of a retainer plate 110 is rotatably externally fitted to a small-diameter step portion 112 formed on an outer peripheral surface of one axial end portion of the outer ring 105. Also, the retainer plate 110 is fixed to the housing 103 by a plurality of screws inserted into a plurality of through-holes 114 (refer to FIG. 21). Thereby, the outer ring 105 is prevented from separating from the retaining concave part 109.

As shown in FIGS. 21 and 22, the retainer plate 110 of the related art is fixed to the housing 103 by the screws inserted into the three through-holes 114 formed with equal intervals in a circumferential direction. Therefore, a pressing force, which is to be applied to a step surface 115 of the small-diameter step portion 112 of the outer ring 105 from the retainer plate 110 as the respective screws are tightened, becomes unequal in the circumferential direction. Specifically, the pressing force to be applied to the step surface 115 is high at parts close to the through-holes 114, and the pressing force to be applied to the step surface 115 becomes lower as it is distant from the through-holes 114. In this way, when the pressing force to be applied to the step surface 115 of the outer ring 105 becomes unequal in the circumferential direction, the outer ring 105 is distorted, so that the roundness of the outer ring raceway 104 may be deteriorated.

According to the bearing device disclosed in Patent Document 1, large-diameter notched portions are formed at portions, which face radially inner sides of the through-holes, of an inner periphery edge of the fitting hole formed at the retainer plate so as to solve the problem that the pressing force of the outer ring is unequal in the circumferential direction. The peripheral edges of the large-diameter notched portions are positioned at radially outermore sides than the outer peripheral surface of the outer ring. Thereby, the pressing force of the outer ring, which is to be applied from the retainer plate as the screws are tightened, is made substantially equal in the circumferential direction, so that the roundness of the outer ring is prevented from being deteriorated.

CITATION LIST

Patent Documents

Patent Document 1: Japanese Patent Application Publication No. 2012-132495A
Patent Document 2: Japanese Patent Application Publication No. 2010-249214A

SUMMARY OF THE INVENTION

Problems to be Solved

However, according to the bearing device disclosed in Patent Document 1, since the fitting hole of the retainer plate to be fitted with the outer ring is provided with the large-diameter notched portions, the fitting hole is not circular. In the meantime, the fitting hole of the retainer plate is required to have a shape as close as possible to a circular shape because it forms a guide surface for the outer ring and high positional precision is required when it is assembled with the outer ring.

The present invention has been made in view of the above situations, and an object of the present invention is to provide a bearing device and a retainer plate for a bearing device capable of sufficiently securing a guide surface for an outer ring at a fitting hole of a retainer plate and securely fixing the outer ring to a housing without influencing roundness of an outer ring raceway.

Means for Solving the Problems

The object of the present invention is accomplished by following configurations.
(1) A bearing device including:
a rolling bearing having an inner ring, an outer ring and a plurality of rolling elements arranged between the inner ring and the outer ring, and
a retainer plate having a substantially circular hole and a plurality of attachment holes provided around the substantially circular hole and configured to enable each of fastening members to be inserted or screwed thereinto, the retainer plate configured to be in contact with the outer ring in an axial direction,
wherein the rolling bearing is fixed to a housing via the retainer plate by fitting the outer ring to the housing and tightening each fastening member to fix the retainer plate to the housing,
wherein a contact surface of the outer ring with which the retainer plate is in contact in the axial direction is positioned at a more axially outboard side by a predetermined distance than a facing surface of the housing that the retainer plate faces, and
wherein the retainer plate is formed with rigidity reducing parts for reducing rigidity of the retainer plate at radially outermore sides than an outer peripheral surface of the outer ring between the substantially circular hole and the attachment holes.
(2) In the bearing device of the above (1), the rigidity reducing parts are through-holes each of which is line-symmetrically formed with respect to a virtual line connecting a center of the substantially circular hole and a center of each attachment hole.

(3) In the bearing device of the above (1), the rigidity reducing parts are concave portions each of which is line-symmetric with respect to a virtual line connecting a center of the substantially circular hole and a center of each attachment hole and is formed from at least one of a front side and a back side of the retainer plate.

(4) In the bearing device of any one of the above (1) to (3), an outer periphery of one axial end portion of the outer ring is provided with a small-diameter step portion to be fitted with the substantially circular hole of the retainer plate, and the rolling bearing and the retainer plate are mounted to be relatively rotatable without separating from each other by engaging a plurality of crushing portions, which are formed at a peripheral edge portion of the substantially circular hole of the retainer plate, to an engagement groove formed at the small-diameter step portion.

(5) A retainer plate for a bearing device having a substantially circular hole and a plurality of attachment holes provided around the substantially circular hole and configured to enable each of fastening members to be inserted or screwed thereinto, the retainer plate configured to be in contact with an outer ring of a rolling bearing in an axial direction, the retainer plate configured to fix the rolling bearing to a housing as the retainer plate is fixed to the housing by tightening each fastening member in a state that the outer ring is fitted to the housing, wherein rigidity reducing parts of reducing rigidity of the retainer plate for a bearing device are formed at radially outermore sides than an outer peripheral surface of the outer ring between the substantially circular hole and the attachment holes.

Effects of the Invention

According to the bearing device and the retainer plate for a bearing device of the present invention, the retainer plate is formed with the rigidity reducing parts for reducing the rigidity of the retainer plate at the radially outermore sides than the outer peripheral surface of the outer ring between the substantially circular hole and the attachment holes. Therefore, axial forces by the fastening members, which are to be applied to the outer ring at radially inner sides of the attachment holes when the retainer plate is fixed to the housing by each fastening member, are relieved and dispersed by the rigidity reducing parts and are then applied to the outer ring. Thereby, it is possible to suppress an influence on the roundness of the outer ring raceway, which is to be caused due to deformation of the retainer plate, thereby favorably maintaining the roundness of the outer ring raceway. Also, since the substantially circular hole of the retainer plate to which the outer ring is to be fitted is circular, it is possible to mount the outer ring and the retainer plate with high positional precision.

Also, the rigidity reducing parts are the through-holes each of which is line-symmetrically formed with respect to the virtual line connecting the center of the substantially circular hole and the center of each attachment hole. Therefore, the axial force by one fastening member is equally dispersed to two places by the through-hole and is then applied to the outer ring, so that it is possible to efficiently suppress the influence on the roundness of the outer ring raceway. Also, it is possible to lighten the retainer plate by the through-holes.

Also, the rigidity reducing parts are the concave portions each of which is line-symmetric with respect to the virtual line connecting the center of the substantially circular hole and the center of each attachment hole and is formed from at least one of the front side and the back side of the retainer plate. Therefore, the axial force by one fastening member is equally dispersed by the concave portion and is then applied to the outer ring, so that it is possible to efficiently suppress the influence on the roundness of the outer ring raceway. Also, it is possible to lighten the retainer plate by the through-holes.

BRIEF DESCRIPTION OF THE DRAWINGS

FIG. 1A is a front view of a bearing device in accordance with a first embodiment, and FIG. 1B is a sectional view.

FIG. 4A is an enlarged sectional view of main parts depicting a state where the bearing device is being fixed to a housing, FIG. 4B is an enlarged sectional view of main parts depicting a state after the bearing device is fixed to the housing, and FIG. 4C is an enlarged sectional view of main parts of FIG. 4B.

FIG. 9A is a front view of a bearing device in accordance with a modified embodiment of the first embodiment, and FIG. 9B is a sectional view.

FIG. 13A is a front view of a bearing device in accordance with a first modified embodiment of the second embodiment, and FIG. 13B is a sectional view.

DETAILED DESCRIPTION OF EMBODIMENTS

Figure 2A:
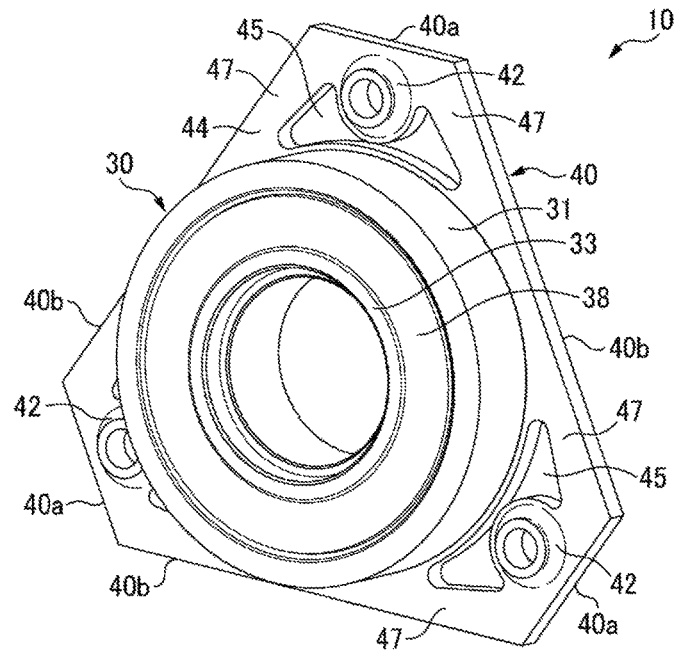
FIG. 2A is a perspective view of the bearing device shown in FIG. 1, as seen from a front side.

Hereinafter, a bearing device and a retainer plate for a bearing device in accordance with respective embodiments of the present invention will be described in detail with reference to the drawings.

(First Embodiment)

A bearing device in accordance with a first embodiment of the present invention is described with reference to FIGS. 1 to 4. A bearing device 10 has a radial rolling bearing 30 and a retainer plate 40 configured to fix the radial rolling bearing 30 to a housing 20 (refer to FIG. 4). The radial rolling bearing 30 and the retainer plate 40 of the first embodiment are mounted so as not to separate from each other, which will be described later.

The radial rolling bearing 30 has an outer ring 31, an inner ring 33, a plurality of balls (rolling elements) 35 and a cage 36. The outer ring 31 is configured to be fitted to a retaining concave part 21 of the housing 20 and has an outer ring raceway 32 on an inner peripheral surface. The inner ring 33 is configured to be fitted to a rotary shaft (not shown) and has an inner ring raceway 34 on an outer peripheral surface. The plurality of balls 35 is held at the cage 36 and is arranged to be freely rollable between the outer ring raceway 32 and the inner ring raceway 34. An outer periphery of one axial end portion of the outer ring 31 is formed with a small-diameter step portion 37. The small-diameter step portion 37 has a step portion outer peripheral surface 37a having a diameter smaller than an outer diameter of the outer ring 31 and a step surface 37b extending radially outward from the step portion outer peripheral surface 37a. The step portion outer peripheral surface 37a is formed with an engagement groove 37c along an entire circumference. Also, seal members 38 are arranged at both axial end portions of the outer ring 31 between the outer ring 31 and the inner ring 33. The seal members 38 are provided to seal the radial rolling bearing 30.

Figure 2B:
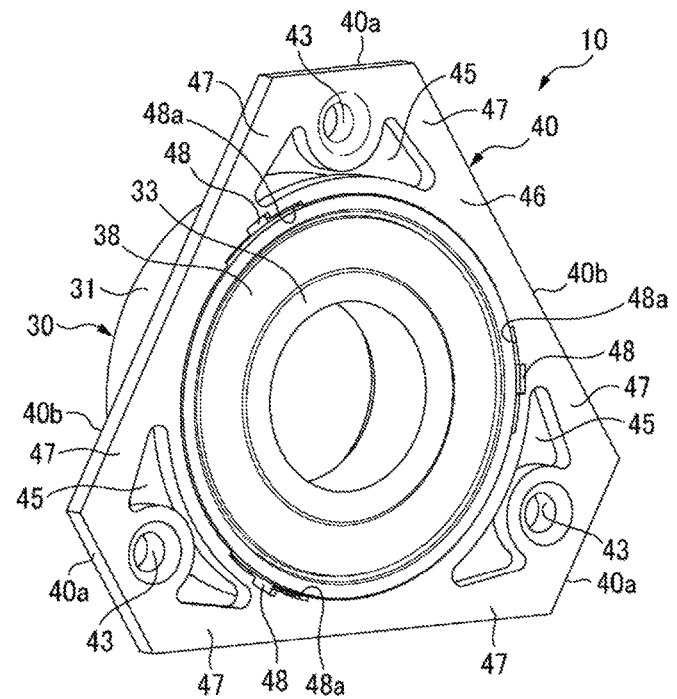
FIG. 2B is a perspective view, as seen from a back side.
Figure 3:
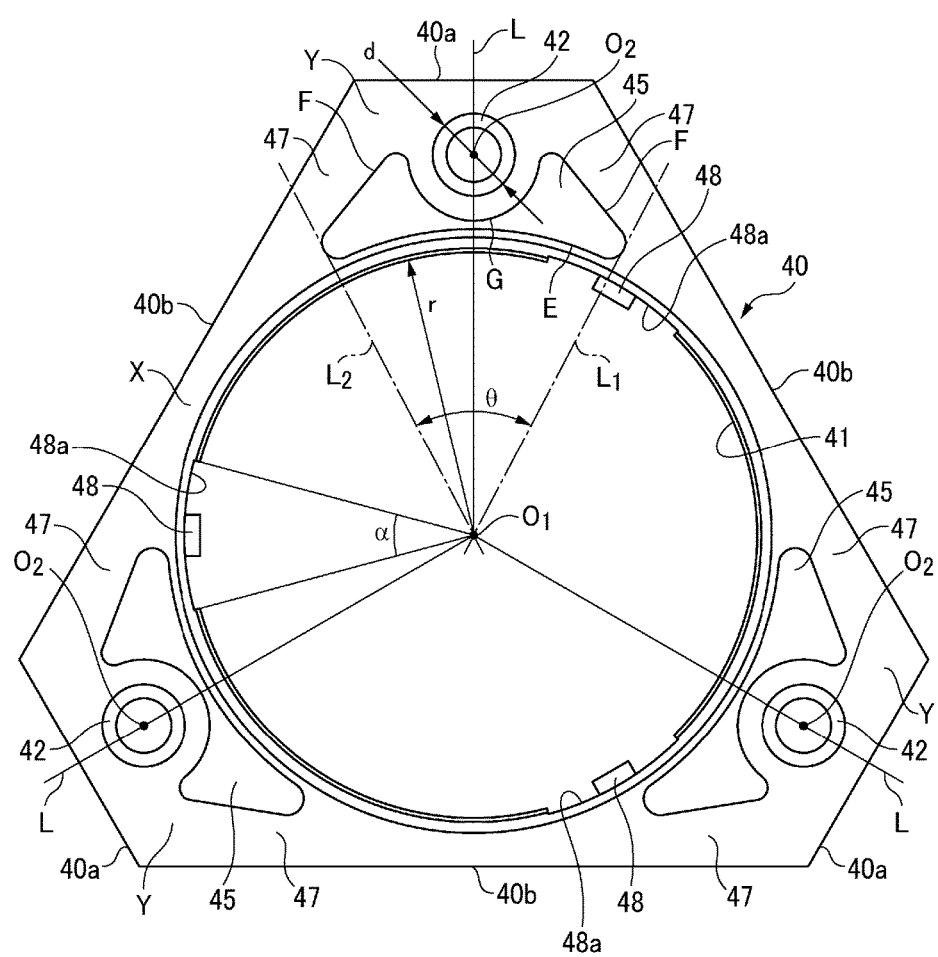
FIG. 3 is a front view of a retainer plate in which a rolling bearing is omitted from the bearing device shown in FIG. 1.

As shown in FIGS. 1A and 3, the retainer plate 40 is a substantially hexagonal plate member of which short sides 40a and long sides 40b are alternately arranged in a circumferential direction. A fitting hole 41 to which the outer ring 31 is to be internally fitted is formed at a center of the retainer plate 40. Also, boss parts 42 are formed at three places corresponding to the short sides 40a and equidistantly spaced in the circumferential direction. As shown in FIG. 4, the boss part 42 is formed with a female screw 43 (attachment hole) into which a male screw 13 of a bolt (fastening member) 12 is to be screwed. Meanwhile, in FIGS. 1 to 4, threads of the male screw 13 and the female screw 43 are not shown.

After fitting the small-diameter step portion 37 of the outer ring 31 to the fitting hole 41 of the retainer plate 40, a thickness of a peripheral edge portion of the fitting hole 41 is made to protrude radially inward by crushing processing, so that a plurality of crushing portions 48 is formed (refer to FIGS. 2B and 3). The plurality of crushing portions 48 is engaged to the engagement groove 37c formed on the step portion outer peripheral surface 37a. Thereby, the radial rolling bearing 30 and the retainer plate 40 are mounted to be relatively rotatable without separating from each other. In the meantime, the fitting hole 41 is formed with relief portions 48a for processing around the respective crushing portions 48. Therefore, the fitting hole 41 of the first embodiment is a substantially circular hole of which the inner peripheral surface except for the crushing portions 48 and the relief portions 48a is formed by a single circle. An angle α between a pair of lines connecting both circumferential end portions of the relief portion 48a and a center O1 of the fitting hole 41 is preferably α≤30°, and more preferably α≤25°.

The bearing device 10 made to be non-separable is fixed to the housing 20 by internally fitting the outer ring 31 of the radial rolling bearing 30 to the retaining concave part 21 formed in the housing 20 and screwing and tightening the bolts 12 inserted into the screw holes 22 of the housing 20 into the female screws 43 of the retainer plate 40, as shown in FIG. 4. Therefore, the outer ring 31 is sandwiched by the housing 20 and the retainer plate 40, so that the radial rolling bearing 30 is prevented from separating from the retaining concave part 21 of the housing 20.

Herein, in order to securely sandwich the outer ring 31 by the housing 20 and the retainer plate 40, the housing 20 and the bearing device 10 are necessarily configured so that an axial gap H is secured between facing surfaces of the housing 20 and the retainer plate 40 when the outer ring 31 is fitted to the retaining concave part 21 of the housing 20, as shown in FIG. 4. That is, the step surface (contact surface) 37b of the outer ring 31, to which the retainer plate 40 is axially contacted when the outer ring 31 is contacted to an axial end surface of the retaining concave part 21 of the housing 20, is positioned at a more axially outboard side by a predetermine distance H than a side surface 23 of the housing 20 that the retainer plate 40 faces. That is, the axial gap H is formed between the side surface (facing surface) 23 of the housing 20 and a side surface (facing surface) 44 of the retainer plate 40.

Therefore, in the first embodiment, in order to suppress the bolt axial forces of the bolts 12 from being locally applied to the outer ring 31 via the retainer plate 40 when fixing the retainer plate 40 to the housing 20 by the bolts 12, the retainer plate 40 is formed with three through-holes 45 having a substantial M shape. The respective through-holes 45 are formed at radially outermore sides than the outer peripheral surface of the outer ring 31 (i.e., at radially outermore sides than the contact part with the step surface 37b) between the fitting hole 41 and the three boss parts 42 in the radial direction.

Specifically, as shown in FIG. 3, each of the through-holes 45 is line-symmetrically formed with respect to a virtual line L connecting a center $O_1$ of the fitting hole 41 of the retainer plate 40 and a center $O_2$ of the boss part 42. Particularly, each of the through-holes 45 of the first embodiment is formed to have a substantial M shape by a circular arc E formed along an inner diameter of the fitting hole 41, a circular arc G formed along an outer diameter of the boss part 42 and two sides F each of which connects both end portions of the circular arc E and both end portions of the circular arc G.

Also, when an outer diameter of the boss part 42 is denoted as d, a radius of the fitting hole 41 is denoted as r, and an included angle between lines L1, L2 connecting the center $O_1$ of the fitting hole 41 and both circumferential end portions of the through-hole 45 is denoted as θ, an angle range θ of the through-hole 45 is preferably (d/2πr× 360°<θ<360°/the number of bosses), and more preferably (d/πr×360°≤θ≤180°/the number of bosses).

The through-holes 45 are provided, so that a central part X for defining the fitting hole 41 and each apex part Y, in which each boss part 42 is formed, are made to be continuous by two arm parts 47 and the rigidity of the retainer plate 40 is weakened between the central part X and each apex part Y.

Therefore, as shown in FIG. 4, when the male screws 13 of the bolts 12 are fastened to the female screws 43 and the bearing device 10 is thus fixed to the housing 20, the axial gap H between the facing surfaces of the housing 20 and the retainer plate 40 (between the side surface 23 of the housing 20 and the side surface 44 of the retainer plate 40) is absorbed as the two arm parts 47 of the retainer plate 40 are positively deformed. Accordingly, the axial force by each bolt 12 is equally dispersed to two places and is then applied to the step surface 37b of the small-diameter step portion 37 of the outer ring 31. Thereby, it is possible to suppress the retainer plate 40 from inclining at the fitting part with the small-diameter step portion 37, so that the step surface 37b of the small-diameter step portion 37 and the retainer plate 40 are surface-contacted each other.

Figure 5B:
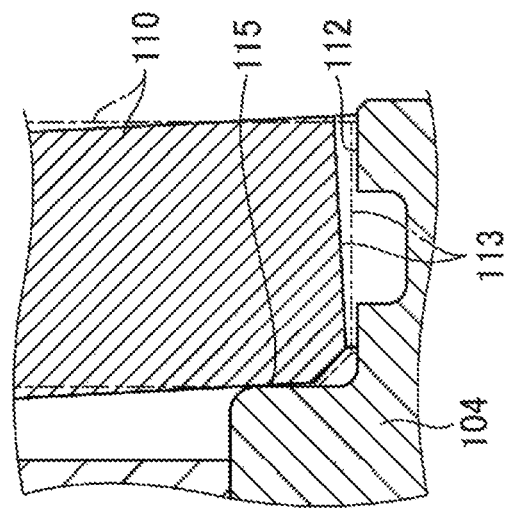
FIG. 5B is an enlarged sectional view of main parts of FIG. 5A.
Figure 5A:
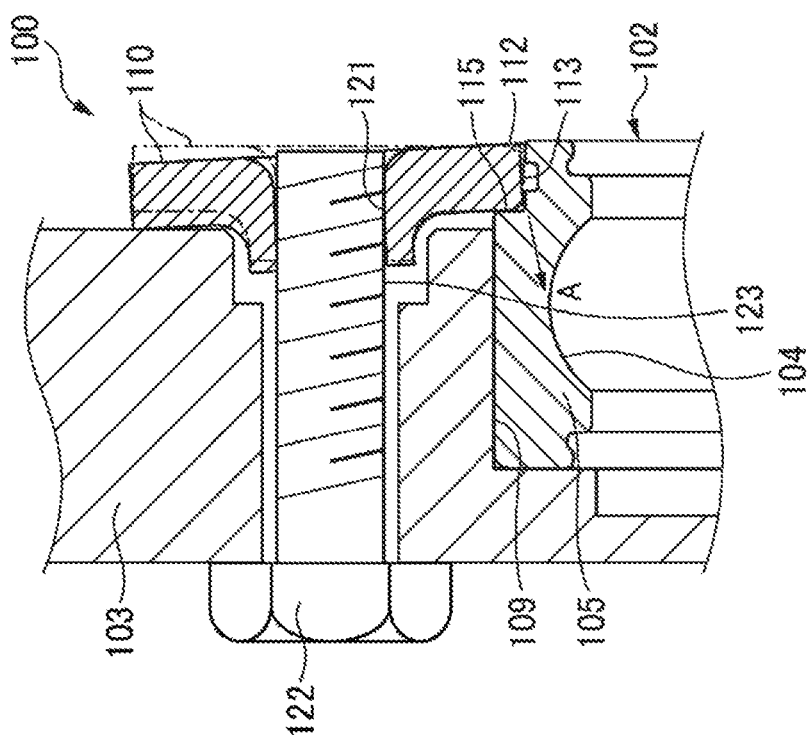
FIG. 5A is an enlarged sectional view of main parts depicting a state after a bearing device of the related art is fixed to the housing.

That is, as shown in FIG. 5, according to a bearing device 100 having no through-holes 45 of the related art, when a male screw 123 of a bolt 122 is fastened to a female screw 121 of a retainer plate 110, the retainer plate 110 is deformed from a shape shown with the dotted line in FIG. 5 into a shape shown with the solid line. That is, the retainer plate 110 is deformed as if it inclines toward the housing 103. At this time, since an outer ring 105 is applied with a force in a direction denoted with an arrow A, an outer ring raceway 104 may be locally deformed.

In contrast, according to the bearing device 10 of the first embodiment, as shown in FIGS. 4B and 4C, when the male screw 13 of the bolt 12 is fastened to the female screw 43, the retainer plate 40 is deformed from a shape shown with the dotted line into a shape shown with the solid line. In this way, the two arm parts 47 of the retainer plate 40 are deformed, so that the axial force (fastening force) by the bolt 12 is dispersed. Thereby, offset of the pressing force, which is to be applied to the outer ring 31, is reduced, so that it is possible to suppress the local stress concentration, which is a cause of the deterioration in the roundness of the outer ring raceway 32, and to prevent an influence on the outer ring raceway 32 resulting from the fixing of the outer ring 31.

That is, the offset of the pressing force of the outer ring 31, which is to be caused by the retainer plate 40 as the bolt 12 is tightened, is difficult to occur and the deformation of the outer ring raceway 32 is suppressed, so that the roundness is maintained. Thereby, the rolling contact state between the outer ring raceway 32 and the balls 35 is appropriately maintained, so that it is possible to prevent vibrations of a rotary shaft and the like and deterioration in durability of the radial rolling bearing 30.

Also, according to the first embodiment, since the inclination of the retainer plate 40 is suppressed, as described above, a contact area between the retainer plate 40 and the step surface 37b of the small-diameter step portion 37 increases. Therefore, the retainer plate 40 can press axially the outer ring 31 over a wider surface, so that it is possible to prevent the pressing force from escaping radially. Thereby, even when vibrations are transmitted from a pulley of a belt CVT, a shaft or the like to the outer ring 31, it is possible to suppress displacement of the outer ring 31, so that it is possible to improve vibration control performance of the bearing device 10.

Figure 6:
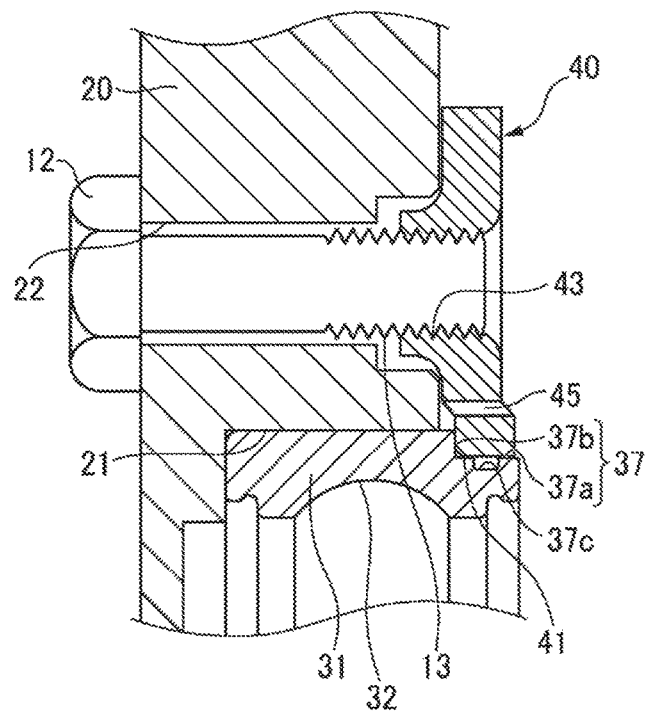
FIG. 6 is the same view as FIG. 4B depicting threads.

Further, as shown in FIG. 6, according to the first embodiment, since the inclination of the retainer plate 40 is suppressed, as described above, center deviation between the male screw 13 of the bolt 12 and the female screw 43 of the boss part 42 of the retainer plate 40 is suppressed. Thereby, threads of the male screw 13 and the female screw 43 are substantially equally meshed with each other over the entire circumference, so that load of each thread is small. As a result, thread strengths of the male screw 13 and the female screw 43 are relatively improved.

Figure 7:
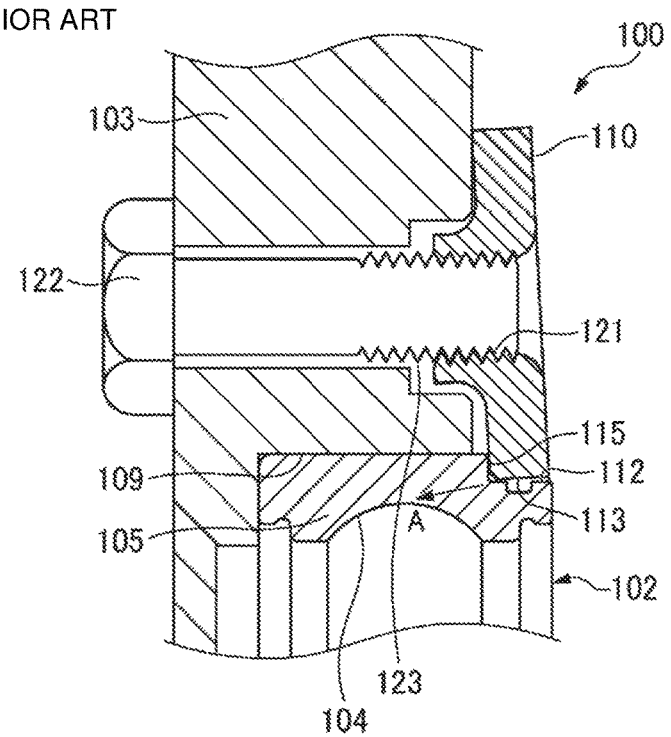
FIG. 7 is the same view as FIG. 5A depicting the threads.
Figure 8:
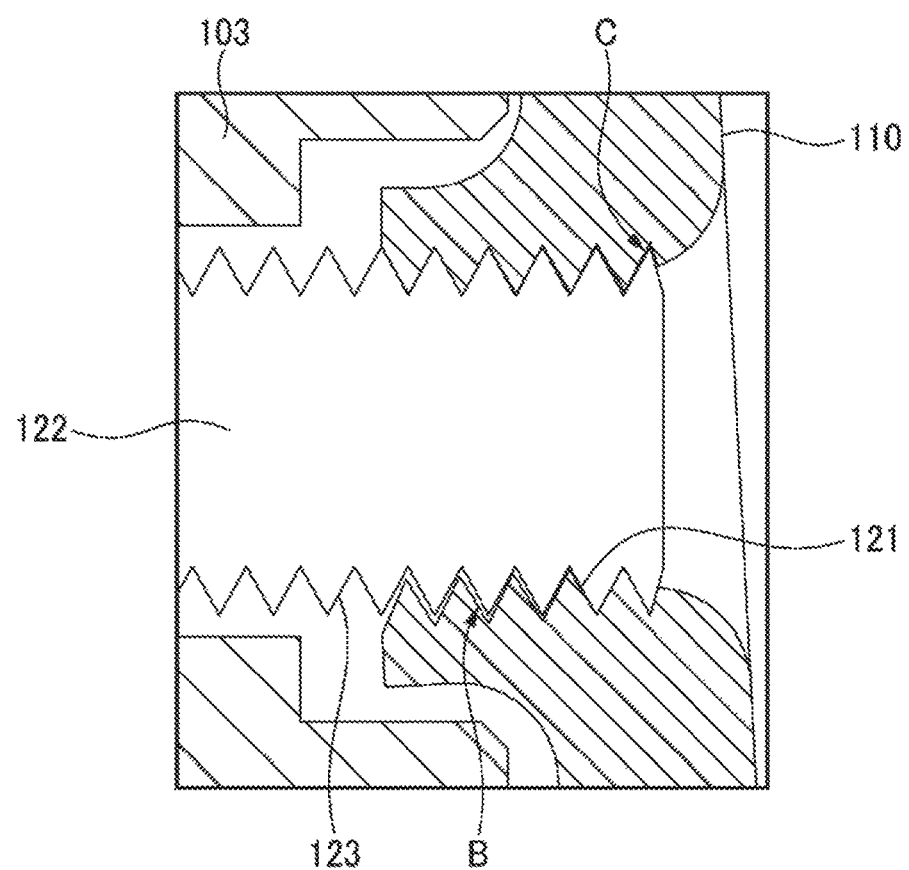
FIG. 8 is an enlarged view of main parts of FIG. 7.

In the meantime, as shown in FIGS. 7 and 8, according to the bearing device 100 having no through-holes 45 of the related art, the retainer plate 110 inclines toward the housing 103. In this case, gaps are formed at some parts (parts denoted with reference numerals B, C in FIG. 8) of meshed parts between threads of the male screw 123 of the bolt 122 and threads of the female screw 121 of the retainer plate 110. As a result, the bolt axial force is generated at threads of a meshed part at which the gap is not formed, so that load of each thread increases. In the worst case, the threads of the male screw 123 and the female screw 121 may be shear-fractured.

Also, the fitting hole 41 of the retainer plate 40 of the first embodiment is mostly formed to have the circular arc without a large notched portion or protrusion. Therefore, the substantially entire circumference of the small-diameter step portion 37 of the outer ring 31 is guided by the fitting hole 41, so that it is possible to fit the retainer plate 40 and the outer ring 31 with high positional precision.

In the meantime, according to the bearing device 10 of the first embodiment, the screw hole 22 of the housing 20 is formed with a relief portion 24 (radial relief portion) so as to prevent interference between the boss part 42 of the retainer plate 40 and the housing 20. Herein, even when the housing 20 and the retainer plate 40 are axially spaced from each other so as to prevent the interference therebetween without forming the large relief portion 24, from standpoints of securement of backup strength of the bearing and deficiency in strength of the housing, it is efficient to disperse the bolt axial forces, which are to be applied to the outer ring 31, by the through-holes 45. Also, a merit that the retainer plate 40 is lightened by the through-holes 45 is obtained.

As described above, according to the bearing device 10 of the first embodiment, the retainer plate 40 is formed with the through-holes 45 for reducing the rigidity of the retainer plate 40 at the radially outermore sides than the outer peripheral surface of the outer ring 31 between the fitting hole 41 and the boss parts 42. For this reason, when the retainer plate 40 is fixed to the housing 20 by each bolt 12, the axial force by one bolt 12, which is to be applied to the outer ring 31 at the radially inner side of the boss part 42, is relieved and dispersed to two places by the through-hole 45 and is then applied to the outer ring 31. Thereby, the influence on the roundness of the outer ring raceway 32, which is to be caused due to the deformation of the retainer plate 40, is suppressed, so that it is possible to favorably maintain the roundness of the outer ring raceway 32.

If the retainer plate 40 is not formed with the through-holes 45 and the axial gap H exists between the facing surfaces of the housing 20 and the retainer plate 40, the retainer plate 40 is inclined, so that the roundness of the outer ring raceway 32 is destroyed and the bearing lifespan is shortened. In this case, if tolerances of axial lengths of the housing 20 and the rolling bearing 30 are strictly set to reduce the axial gap H and a deviation, it is possible to suppress the decrease in the bearing lifespan due to the roundness destruction and to thus satisfy the required lifespan. However, the manufacturing cost increases and the fraction defective upon the manufacturing may increase. In contrast, according to the first embodiment, even when the tolerances of the axial lengths of the housing 20 and the rolling bearing 30 are relaxed to increase the axial gap H and the deviation, since the retainer plate 40 is provided with the through-holes 45, it is possible to reduce the influence of the axial gap H on the roundness destruction of the outer ring raceway 32. That is, it is possible to ease the tolerances of the axial lengths of the housing 20 and the rolling bearing 30.

Also, since the fitting hole 41 of the retainer plate 40 to which the outer ring 31 is fitted is substantially circular, it is possible to mount the outer ring 31 and the retainer plate 40 with high positional precision.

Further, since the through-hole 45 is line-symmetrically formed with respect to the virtual line L connecting the center $O_1$ of the fitting hole 41 and the center $O_2$ of the boss part 42, the axial force by one bolt 12 is equally dispersed to two places by the through-holes 45 and is then applied to the outer ring 31, so that it is possible to effectively suppress the influence on the roundness of the outer ring raceway 32. Also, it is possible to lighten the retainer plate 40 by the through-holes 45.

Figure 10A:
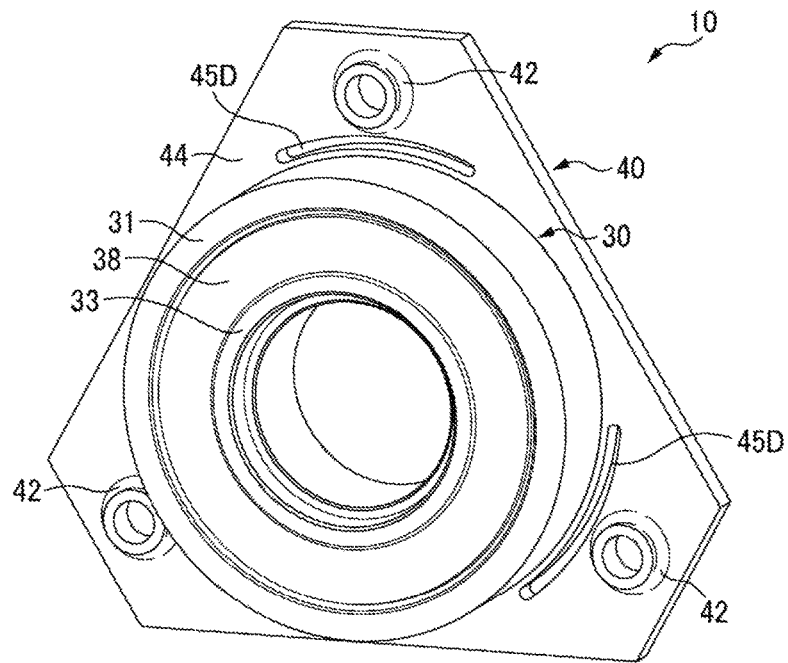
FIG. 10A is a perspective view of the bearing device shown in FIG. 9, as seen from a front side.
Figure 10B:
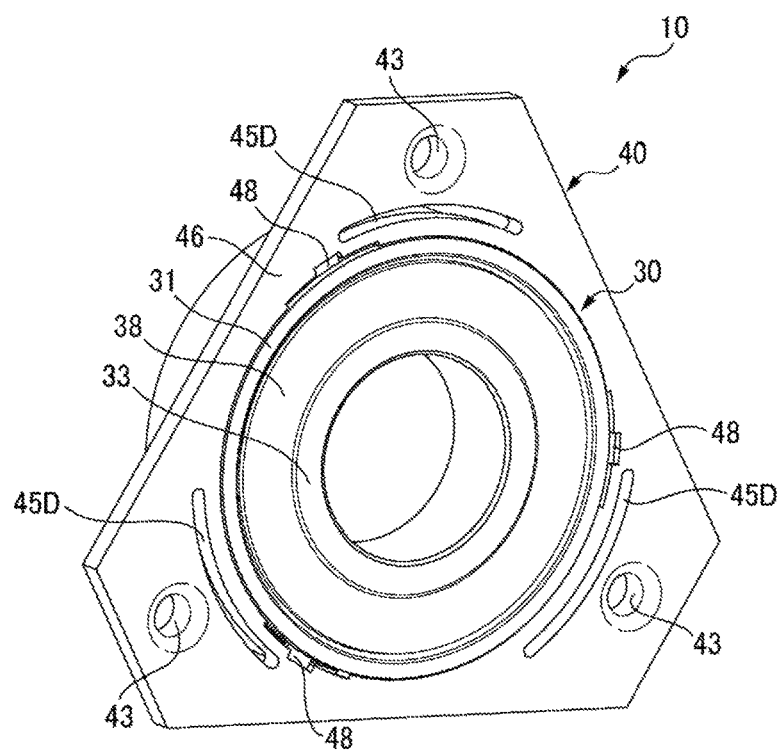
FIG. 10B is a perspective view, as seen from a back side.

Meanwhile, in a modified embodiment of the first embodiment, as shown in FIGS. 9 and 10, through-holes 45D formed at the radially outermore sides than the outer peripheral surface of the outer ring 31 between the fitting hole 41 of the retainer plate 40 and the three boss parts 42 may be formed to have a circular arc shape along the inner peripheral surface of the fitting hole 41. The through-hole 45D is also line-symmetrically formed with respect to the virtual line L connecting the center $O_1$ of the fitting hole 41 of the retainer plate 40 and the center $O_2$ of each boss part 42.

(Second Embodiment)

Figure 11B:
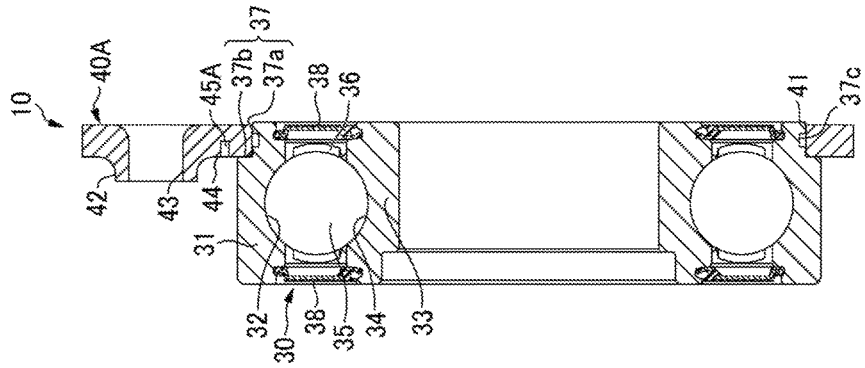
FIG. 11B is a sectional view.
Figure 11A:
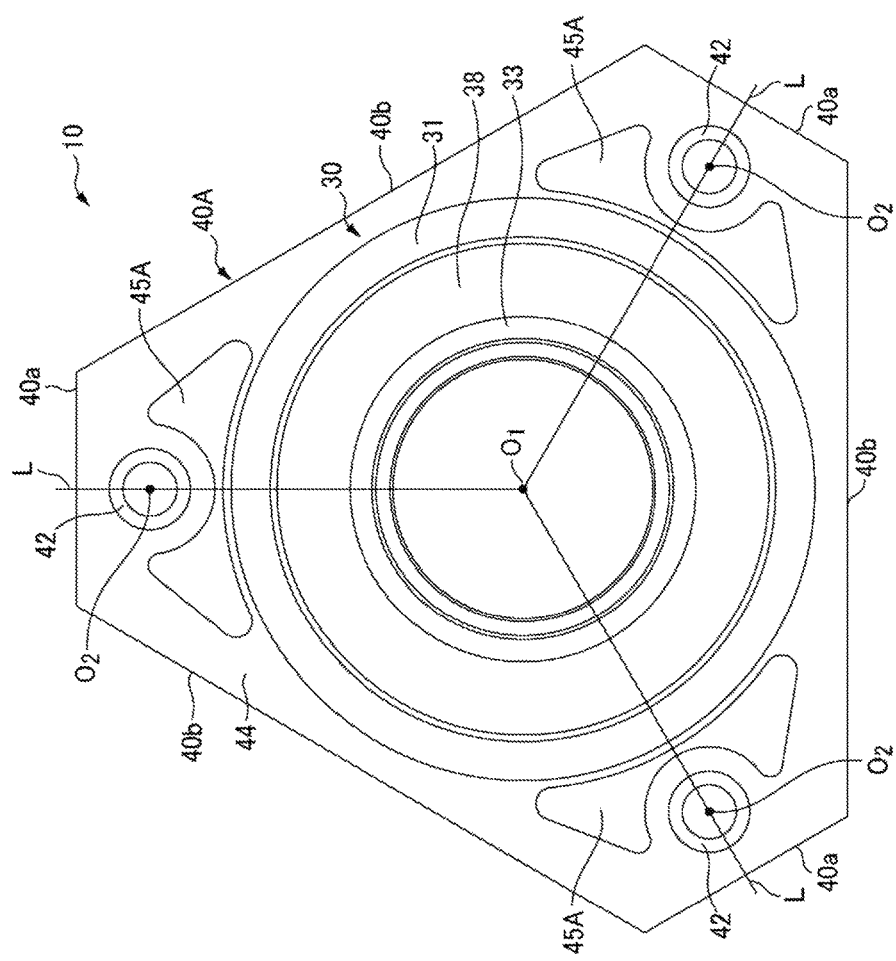
FIG. 11A is a front view of a bearing device in accordance with a second embodiment.
Figure 12A:
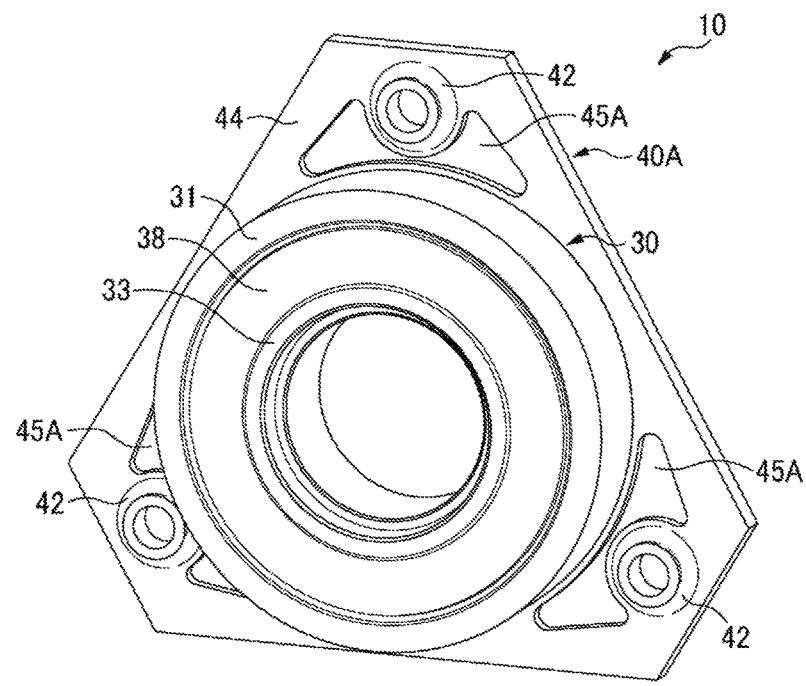
FIG. 12A is a perspective view of the bearing device shown in FIG. 11, as seen from a front side.
Figure 12B:
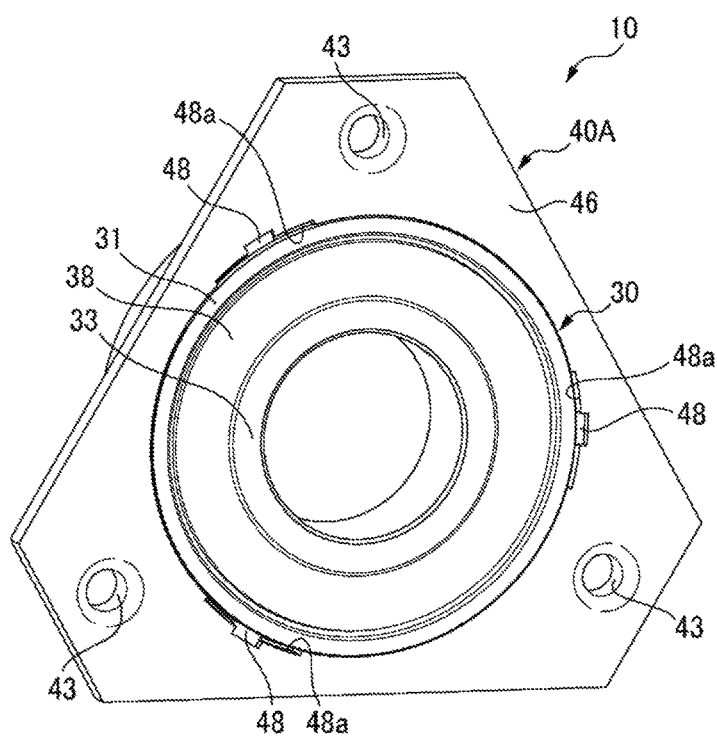
FIG. 12B is a perspective view, as seen from a back side.

FIGS. 11A and 11B are a front view and a sectional view of a bearing device in accordance with a second embodiment, and FIGS. 12A and 12B are perspective views of the bearing device, as seen from a front side and a back side.

According to the retainer plate 40 of the first embodiment, the rigidity reducing parts are formed by the through-holes 45. However, according to a retainer plate 40A of the second embodiment, the rigidity reducing parts are formed as concave portions 45A having a substantial M shape and press-formed from a surface (side surface 44)-side of the retainer plate 40A.

The concave portion 45A has the same size as the through-hole 45 of the retainer plate 40 of the first embodiment, and is formed at the radially outermore side than the outer peripheral surface of the outer ring 31 between the fitting hole 41 of the retainer plate 40 and each of the three boss parts 42. Also, the concave portion 45A is line-symmetrically formed with respect to a virtual line L connecting the center $O_1$ of the fitting hole 41 of the retainer plate 40A and the center $O_2$ of each boss part 42. The strength of the rigidity reducing part can be arbitrarily set by a depth of the concave portion 45A.

As described above, according to the bearing device 10 of the second embodiment, the rigidity reducing part is the concave portion 45A line-symmetrically formed with respect to the virtual line L connecting the center $O_1$ of the fitting hole 41 and the center $O_2$ of each boss part 42 and formed from the surface (side surface 44)-side of the retainer plate 40. Therefore, the axial force by one bolt 12 is equally dispersed by the concave portion 45A and is then applied to the outer ring 31, so that it is possible to efficiently suppress the influence on the roundness of the outer ring raceway 32. Also, it is possible to lighten the retainer plate 40 by the concave portions 45A. The other configurations and operations are the same as the first embodiment.

Figure 14A:
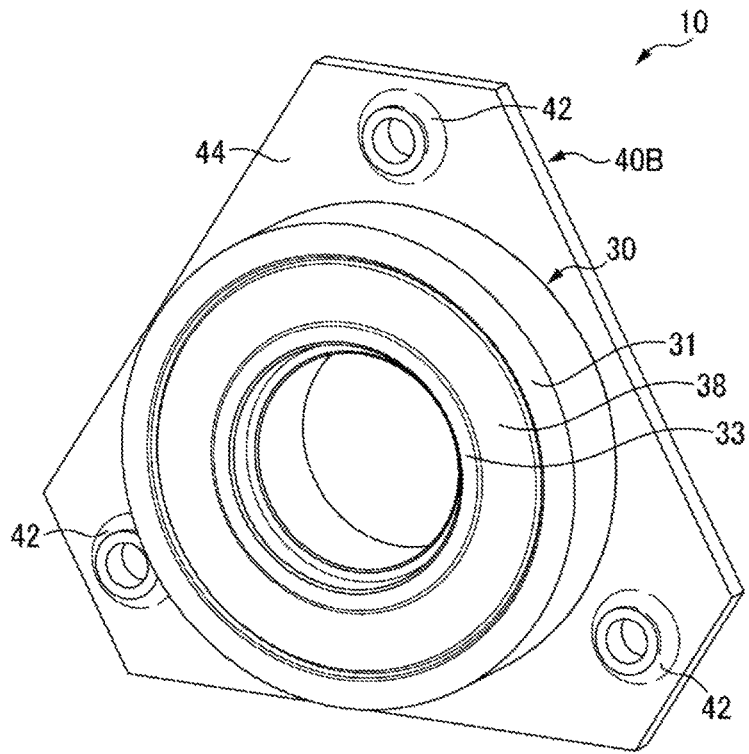
FIG. 14A is a perspective view of the bearing device shown in FIG. 13, as seen from a front side.
Figure 14B:
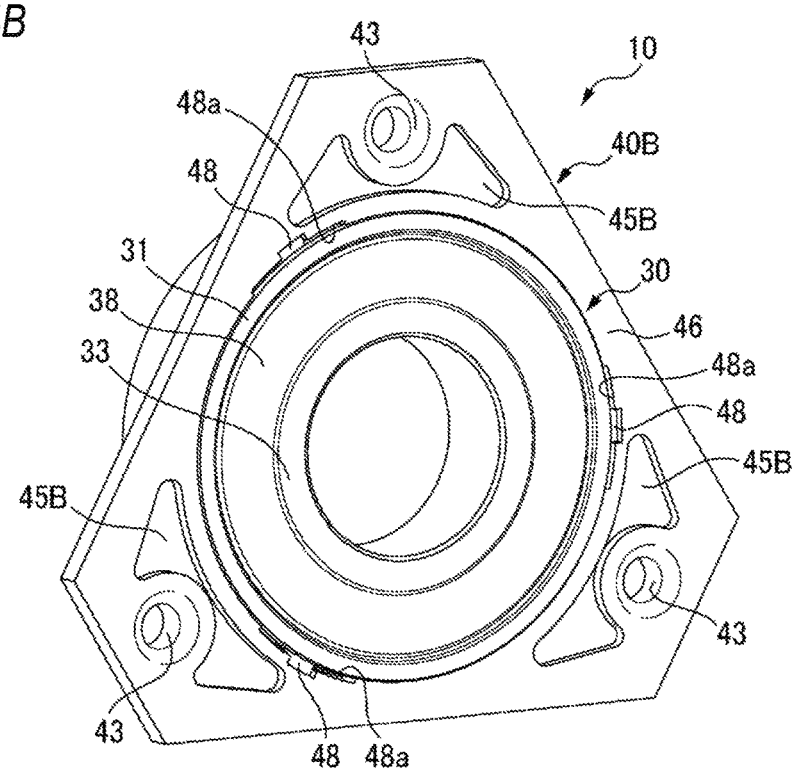
FIG. 14B is a perspective view, as seen from a back side.

Also, in the second embodiment, the concave portion 45A is formed from the surface (side surface 44)-side of the retainer plate 40A. However, like a first modified embodiment shown in FIGS. 13 and 14, concave portions 45B serving as the rigidity reducing parts may be press-formed from a back side 46 of a retainer plate 40B.

Figure 15B:
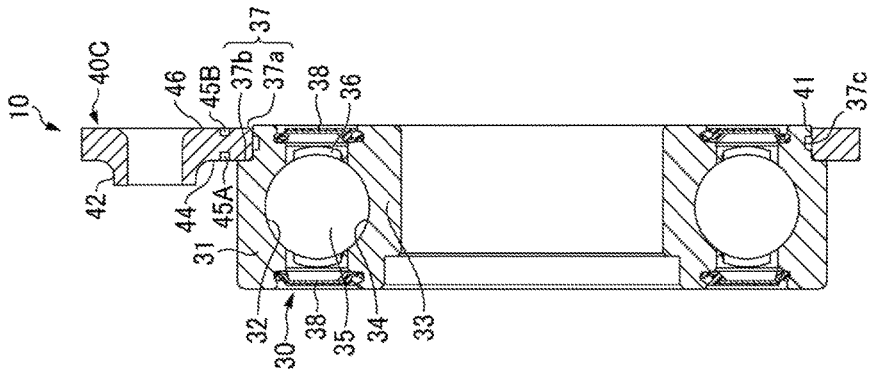
FIG. 15B is a sectional view.
Figure 15A:
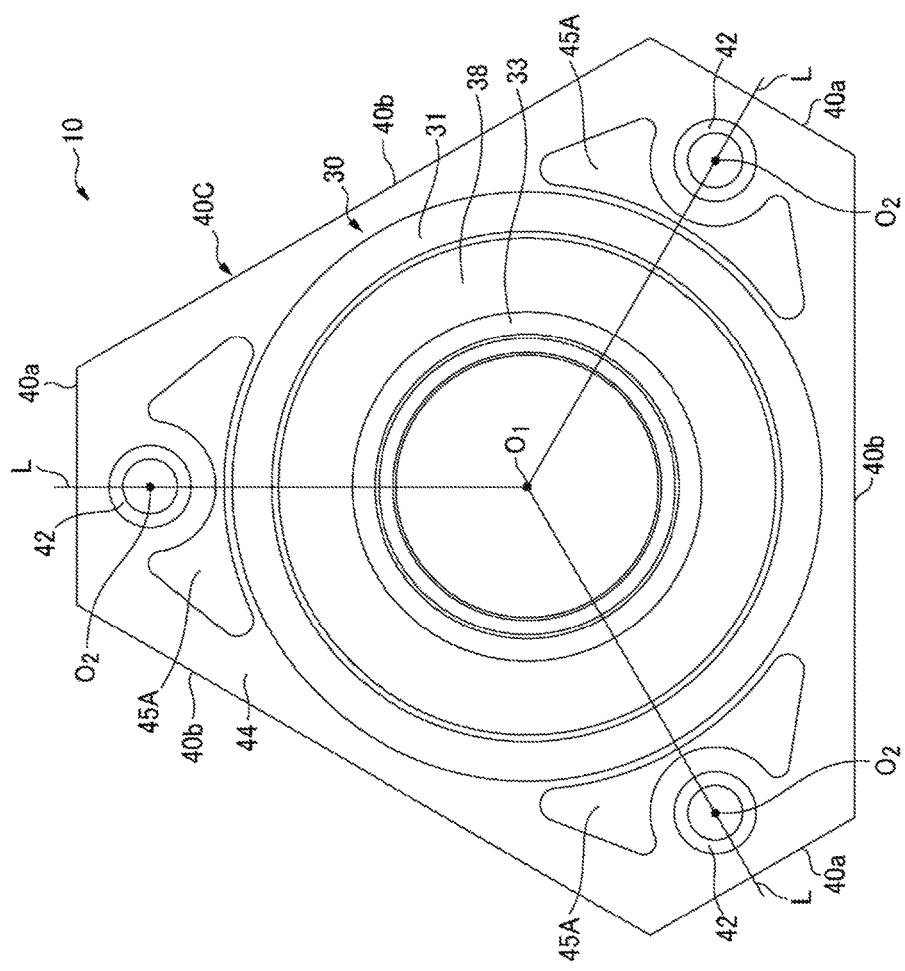
FIG. 15A is a front view of a bearing device in accordance with a second modified embodiment of the second embodiment.
Figure 16A:
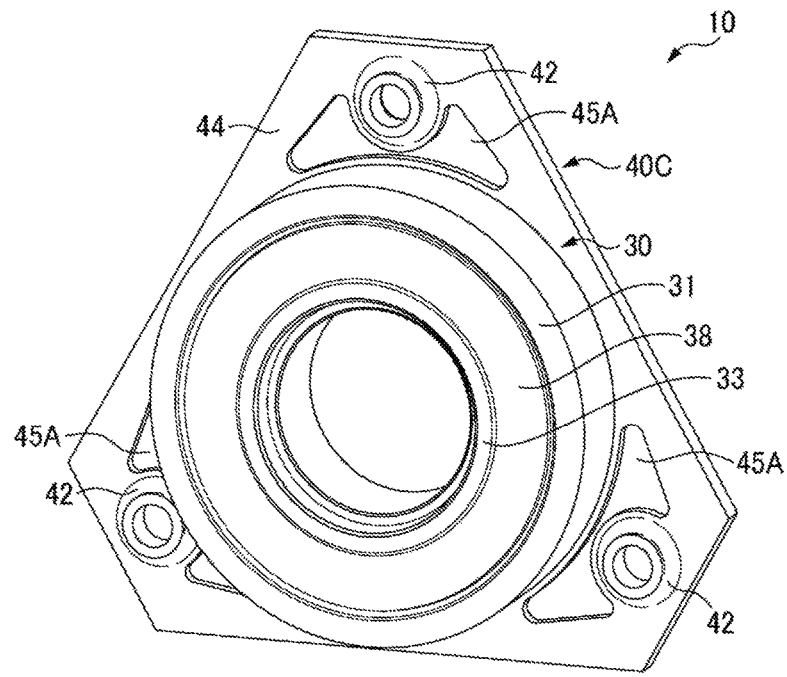
FIG. 16A is a perspective view of the bearing device shown in FIG. 15, as seen from a front side.
Figure 16B:
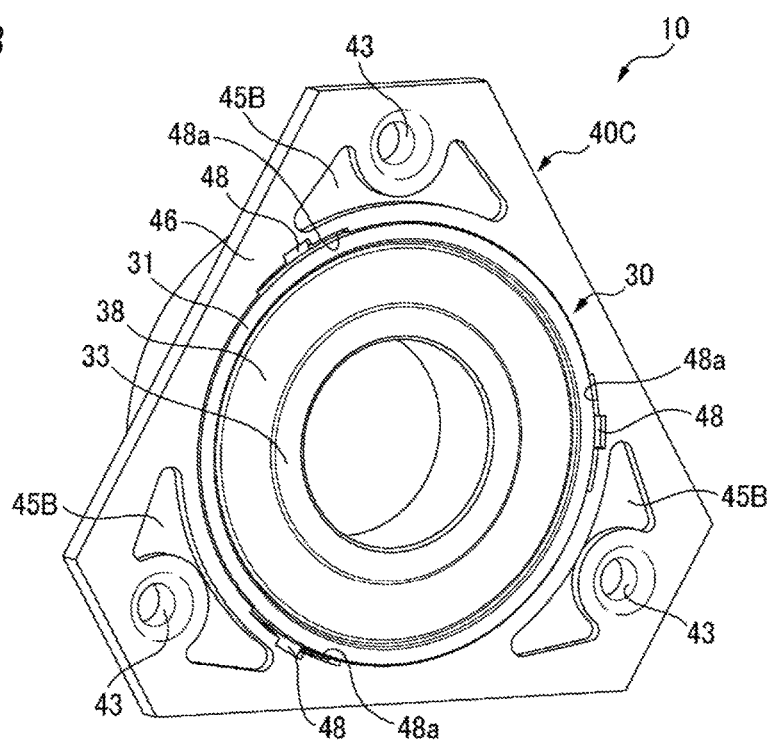
FIG. 16B is a perspective view, as seen from a back side.

Also, like a second modified embodiment shown in FIGS. 15 and 16, a retainer plate 40C may be provided with the concave portions 45A having a substantial M shape and press-formed from the surface (side surface 44)-side of the retainer plate 40C and the concave portions 45B having a substantial M shape and press-formed from the back side 46 of the retainer plate 40C at the rear of the concave portions 45A.

Also, the shapes of the concave portion 45A and the concave portion 45B are not required to be the same and can be appropriately changed.

(Third Embodiment)

Figure 17:
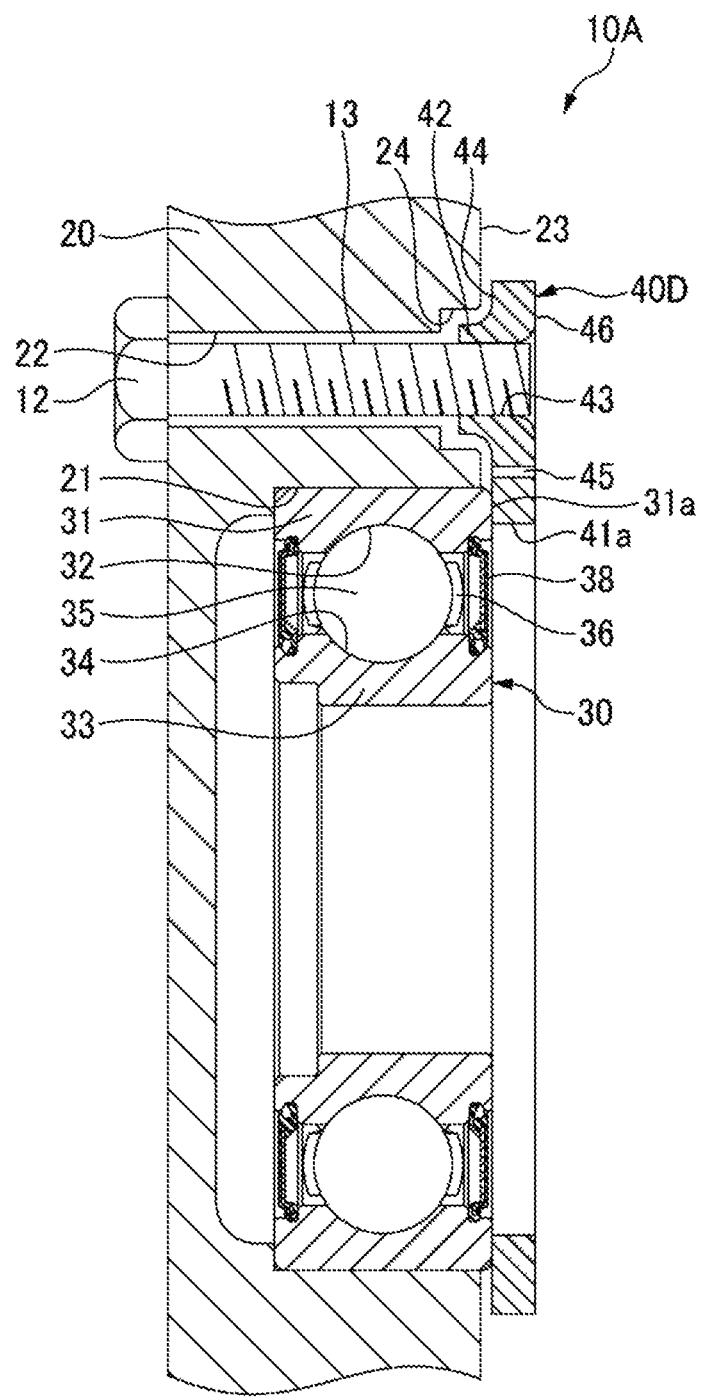
FIG. 17 is a sectional view of a bearing device in accordance with a third embodiment.

Subsequently, a bearing device and a retainer plate for a bearing device in accordance with a third embodiment of the present invention are described with reference to FIGS. 17 and 18. In a bearing device 10A of the third embodiment, instead of the retainer plates of the first and second embodiments, i.e., the retainer plates 40, 40A, 40B, 40C to be mounted to be relatively rotatable without separating from the rolling bearing 30, a stopper plate, i.e., a retainer plate 40D separated from the rolling bearing 30 is used. For this reason, the outer ring 31 of the rolling bearing 30 is not provided with the small-diameter step portion 37 and the engagement groove 37c, and a fitting hole (substantially circular hole) 41a of the retainer plate 40D is not provided with the crushing portion and the relief portion.

Also in the third embodiment, a contact surface 31a of the outer ring 31, to which the retainer plate 40D is axially contacted when fitting the outer ring 31 to the housing 20, is positioned at a more axially outboard side by a predetermined distance H than the side surface (facing surface) 23 of the housing 20 that the retainer plate 40D faces. Then, the retainer plate 40D is axially contacted to the outer ring 31 with phases of the screw holes 22 of the housing 20 and the female screws 43 of the retainer plate 40D being matched. Then, each bolt 12 is tightened to fix the retainer plate 40D to the housing 20, so that the rolling bearing 30 is fixed to the housing 20 via the retainer plate 40D.

The retainer plate 40D is formed with the through-holes 45 having the same shape as the first embodiment (refer to FIG. 1) at the radially outermore sides (i.e., at the radially outermore sides than the contact part with the contact surface 31a) between the fitting hole 41a and the three boss parts 42 in the radial direction. Therefore, as shown in FIG. 18, when the male screws 13 of the bolts 12 are fastened to the female screws 43 and the bearing device 10A is thus fixed the housing 20, the axial gap H between the facing surfaces of the housing 20 and the retainer plate 40D (between the side surface 23 of the housing 20 and the side surface 44 of the retainer plate 40D) is absorbed as the two arm parts 47 (refer to FIG. 1) of the retainer plate 40D are positively deformed. The axial force by each bolt 12 is equally distributed to two places and is then applied to the contact surface 31a of the outer ring 31. Thereby, it is possible to prevent the retainer plate 40D from inclining at the contact part with the contact surface 31a.

Figure 19:
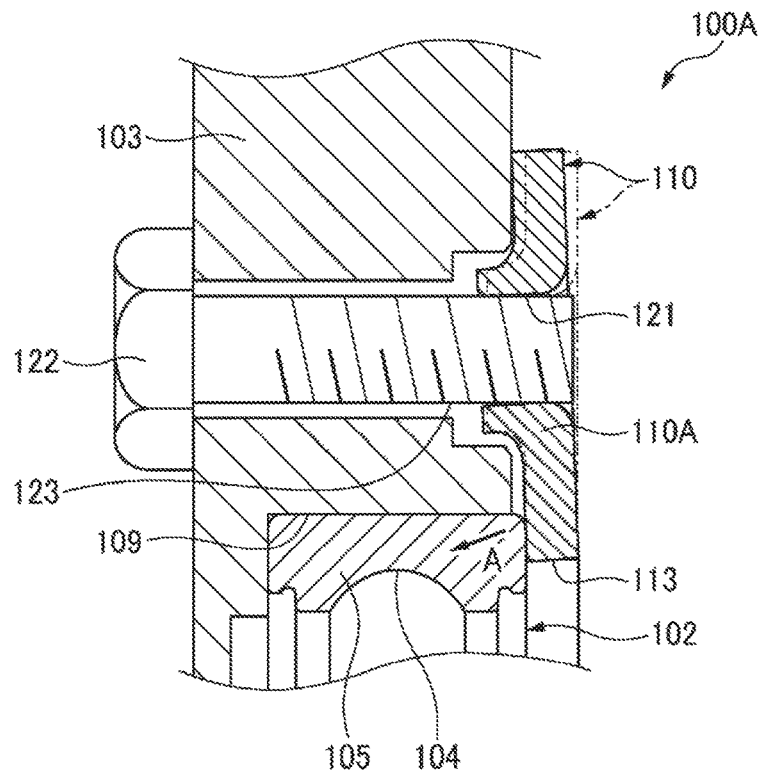
FIG. 19 is an enlarged sectional view of main parts depicting a state after a bearing device of the related art is fixed to a housing.
Figure 20:
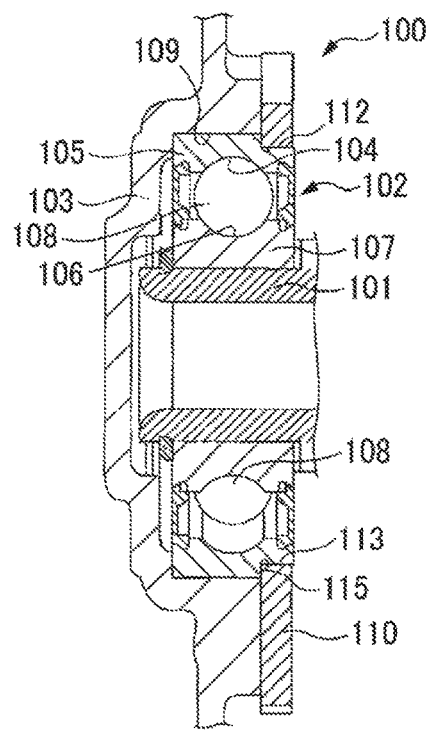
FIG. 20 is a partially sectional view depicting an example of a bearing device of the related art.
Figure 21:
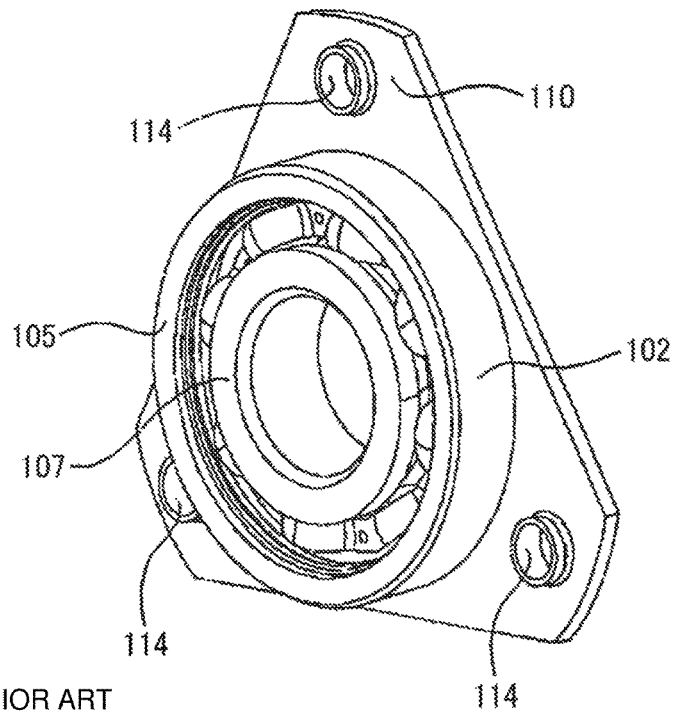
FIG. 21 is a perspective view of the bearing device shown in FIG. 20.
Figure 22:
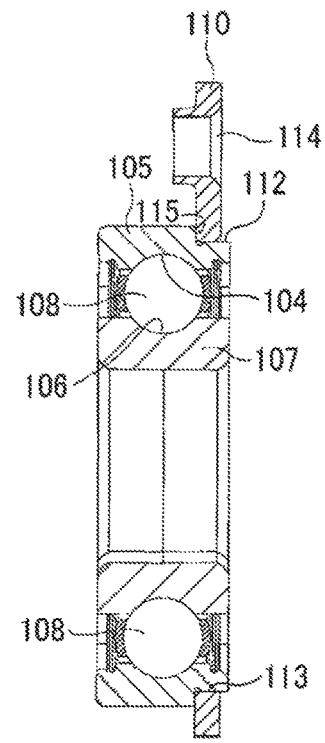
FIG. 22 is a sectional view of the bearing device shown in FIG. 21.

That is, as shown in FIG. 19, according to a bearing device 100A having no through-holes 45 of the related art, when the male screw 123 of the bolt 122 is fastened to the female screw 121 of the retainer plate 110, the retainer plate 110 is deformed from a shape shown with the dotted line in FIG. 19 into a shape shown with the solid line. That is, the retainer plate 110 is deformed as if it inclining toward the housing 103. At this time, since the outer ring 105 is applied with a force in a direction denoted with an arrow A, the outer ring raceway 104 may be locally deformed.

Figure 18B:
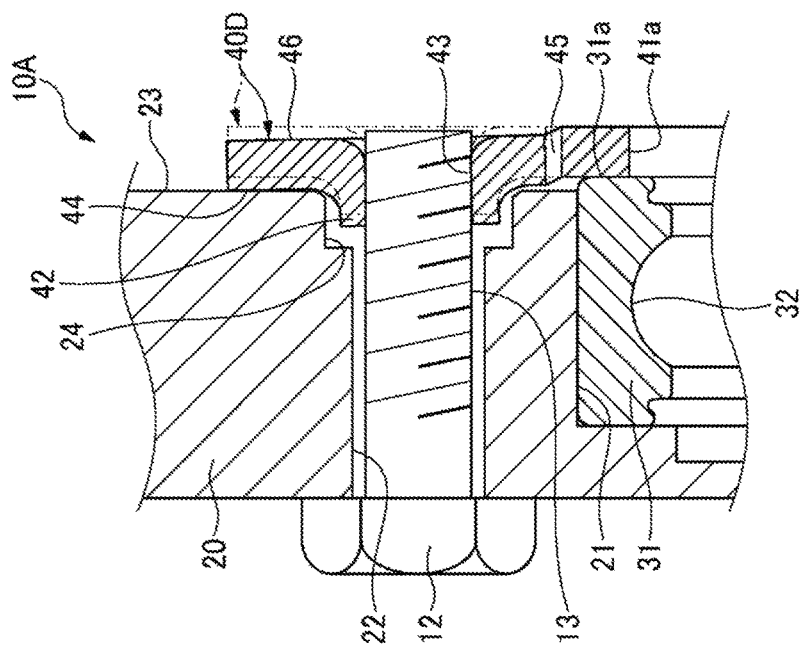
FIG. 18B is an enlarged sectional view of main parts depicting a state after the bearing device is fixed to the housing.
Figure 18A:
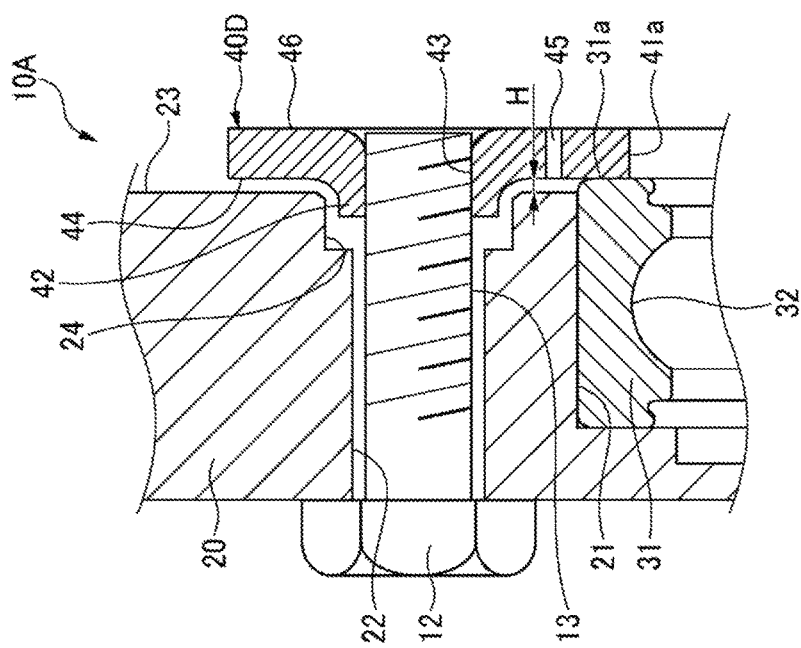
FIG. 18A is an enlarged sectional view of main parts depicting a state where the bearing device is being fixed to the housing.

In contrast, according to the bearing device 10A of the third embodiment, as shown in FIG. 18B, when the male screw 13 of the bolt 12 is fastened to the female screw 43, the retainer plate 40D is deformed from a shape shown with the dotted line in FIG. 18B into a shape shown with the solid line. In this way, the two arm parts 47 of the retainer plate 40D are deformed, so that the axial force (fastening force) by the bolt 12 is dispersed. Thereby, the offset of the pressing force, which is to be applied to the outer ring 31, is reduced, so that it is possible to suppress the local stress concentration, which is a cause of the deterioration in the roundness of the outer ring raceway 32, and to prevent the influence on the outer ring raceway 32 resulting from the fixing of the outer ring 31.

That is, the offset of the pressing force of the outer ring 31, which is to be caused by the retainer plate 40D as the bolt 12 is tightened, is difficult to occur and the deformation of the outer ring raceway 32 is suppressed, so that the roundness is maintained. Thereby, the rolling contact state between the outer ring raceway 32 and the balls 35 is appropriately maintained, so that it is possible to prevent the vibrations of a rotary shaft and the like and the deterioration in durability of the radial rolling bearing 30.

Also, since the fitting hole 41a of the retainer plate 40D of the third embodiment is formed to have a circular shape without a notched portion and a protrusion, the entire circumference of the contact surface 31a of the outer ring 31 is equally pressed to the housing 20 by the fitting hole 41a.

The other configurations and operations are the same as the first and second embodiments. In the meantime, also in the third embodiment, the configuration of the rigidity reducing part is not limited to the through-hole 45 and the configurations of the above embodiments or modified embodiments can be applied.

In the meantime, the present invention is not limited to the above embodiments and the modified embodiments, and can be appropriately modified and improved.

For example, the shapes of the through-hole and the concave portion are not limited to the configurations of the above embodiments and the modified embodiments and can be arbitrarily made. Also in this case, the through-hole or concave portion is preferably line-symmetrically formed with respect to the virtual line connecting the center of the fitting hole of the retainer plate and the center of the boss part.

Also, the through-holes 45, 45D and the concave portions 45A, 45B of the above embodiments may be formed by punching or crushing the retainer plate 40 with a press, by cutting the retainer plate or by using the two techniques together. Also, when the press working is used, the punching is not limited to one pressing and may be performed in multiple processes by progressive processing.

The subject application is based on a Japanese Patent Application No. 2014-108948 filed on May 27, 2014, a Japanese Patent Application No. 2014-180287 filed on Sep. 4, 2014 and a Japanese Patent Application No. 2015-026621 filed on Feb. 13, 2015, which are herein incorporated by reference.

DESCRIPTION OF REFERENCE NUMERALS 10, 10A: bearing device, 12: bolt (fastening member), 13: male screw, 20: housing, 21: retaining concave part, 30: rolling bearing, 31: outer ring, 33: inner ring, 35: ball (rolling element), 37: small-diameter step portion, 37a: step portion outer peripheral surface, 37b: step surface (contact surface), 40, 40A, 40B, 40C, 40D: retainer plate, 41, 41a: fitting hole (substantially circular hole), 42: boss part, 43: female screw (attachment hole), 45, 45D: through-hole (rigidity reducing part), 45A, 45B: concave portion (rigidity reducing part), L: virtual line, $O_1$: center of fitting hole, $O_2$: center of attachment hole

The invention claimed is:

1. A bearing device comprising:
   a rolling bearing having an inner ring, an outer ring and a plurality of rolling elements arranged between the inner ring and the outer ring, and
   a retainer plate having a substantially circular hole, a plurality of attachment holes provided around the substantially circular hole and configured to enable each of fastening members to be inserted or screwed thereinto, and a plurality of boss parts formed with the attachment holes, the retainer plate configured to be in contact with the outer ring in an axial direction,
   wherein the rolling bearing is fixed to a housing via the retainer plate by fitting the outer ring to the housing and tightening each fastening member to fix the retainer plate to the housing,
   wherein a contact surface of the outer ring with which the retainer plate is in contact in the axial direction is positioned at a more axially outboard side by a predetermined distance than a facing surface of the housing that the retainer plate faces,
   wherein the retainer plate is formed with rigidity reducing parts for reducing rigidity of the retainer plate at radially outermore sides than an outer peripheral surface of the outer ring between the substantially circular hole and the attachment holes,
   wherein the rigidity reducing parts are through-holes each of which is line-symmetrically formed with respect to a virtual line connecting a center of the substantially circular hole and a center of each attachment hole, and
   wherein when an outer diameter of a boss part, of the plurality of boss parts, is denoted as d, a radius of the substantially circular hole is denoted as r, and an included angle between lines connecting the center of the substantially circular hole and both circumferential end portions of a through-hole, of the through-holes, is denoted as θ, $d/\pi r \times 360° \leq \theta \leq 180°$/the number of boss parts is satisfied.

2. The bearing device according to claim 1,
   wherein an outer periphery of one axial end portion of the outer ring is provided with a small-diameter step portion to be fitted with the substantially circular hole of the retainer plate, and
   wherein the rolling bearing and the retainer plate are mounted to be relatively rotatable without separating from each other by engaging a plurality of crushing portions, which are formed at a peripheral edge portion of the substantially circular hole of the retainer plate, to an engagement groove formed at the small-diameter step portion.

3. A retainer plate for a bearing device having a substantially circular hole and a plurality of attachment holes provided around the substantially circular hole and configured to enable each of fastening members to be inserted or screwed thereinto, and a plurality of boss parts formed with the attachment holes, the retainer plate configured to be in contact with an outer ring of a rolling bearing in an axial direction, the retainer plate configured to fix the rolling bearing to a housing as the retainer plate is fixed to the housing by tightening each fastening member in a state that the outer ring is fitted to the housing, wherein rigidity reducing parts of reducing rigidity of the retainer plate for a bearing device are formed at radially outermore sides than an outer peripheral surface of the outer ring between the substantially circular hole and the attachment holes, wherein the rigidity reducing parts are through-holes each of which is line-symmetrically formed with respect to a virtual line connecting a center of the substantially circular hole and a center of each attachment hole, and wherein when an outer diameter of a boss part, of the plurality of boss parts, is denoted as d, a radius of the substantially circular hole is denoted as r, and an included angle between lines connecting the center of the substantially circular hole and both circumferential end portions of a through-hole, of the through holes, is denoted as $\theta$, $d/\pi r \times 360° \leq \theta \leq 180°/$the number of boss parts is satisfied.

* * * * *